United States Patent
Takahashi

(10) Patent No.: US 7,755,705 B2
(45) Date of Patent: Jul. 13, 2010

(54) TELEVISION RECEIVER WITH MULTIPLE VOICE OUTPUTS

(75) Inventor: Ryuji Takahashi, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 1199 days.

(21) Appl. No.: 11/344,148

(22) Filed: Feb. 1, 2006

(65) Prior Publication Data

US 2006/0171565 A1  Aug. 3, 2006

(30) Foreign Application Priority Data

Feb. 2, 2005  (JP)  .............................. 2005-025962

(51) Int. Cl.
*H04N 5/60* (2006.01)
(52) U.S. Cl. .................................... 348/738
(58) Field of Classification Search ................. 348/632, 348/738, 372, 375; 381/27; 700/94; 725/126
See application file for complete search history.

(56) References Cited

U.S. PATENT DOCUMENTS

| 5,014,125 | A | * | 5/1991 | Pocock et al. ................. 725/93 |
| 6,075,566 | A | * | 6/2000 | Suemoto et al. ............. 348/372 |
| 6,151,067 | A | * | 11/2000 | Suemoto et al. ........ 348/207.99 |
| 2003/0014766 | A1 | * | 1/2003 | Dinwiddie et al. .......... 725/126 |
| 2006/0089735 | A1 | * | 4/2006 | Atkinson ...................... 700/94 |
| 2007/0009119 | A1 | * | 1/2007 | Kim .......................... 381/306 |
| 2007/0133812 | A1 | * | 6/2007 | Yoshizawa et al. ............ 381/27 |

FOREIGN PATENT DOCUMENTS

JP  5-161084 A  6/1993

\* cited by examiner

*Primary Examiner*—Paulos M Natnael
(74) *Attorney, Agent, or Firm*—Crowell & Moring LLP

(57) ABSTRACT

A television receiver comprising: an internal speaker to output voice; a digital terminal to perform digital voice output, to which an external device is connected; a connection detection unit to detect whether an external device is connected to the digital terminal, or not; and a voice mute circuit to mute a voice output from the internal speaker when the connection detection unit detects that the external device is connected to the digital terminal.

11 Claims, 6 Drawing Sheets

TELEVISION RECEIVER WITH MULTIPLE VOICE OUTPUTS

BACKGROUND OF THE INVENTION

1. Field of the Invention

The present invention relates to a television receiver, and in particular relates to a television receiver comprising multiple voice output units.

2. Description of Related Art

Generally, in television receivers, those comprising multiple voice output units having a single or multiple analog input/output terminal or digital input/output terminal connected to external devices in addition to internal speakers built-in the television are known. In these, as the digital terminal, there are an optical system where signals are sent and received by light and a coaxial terminal system using coaxial terminal which can send and receive multiple channel signals by one cable.

Recently, those in which various playback equipments such as DVD player and playback equipment of videotape have been integrated in the television receiver are proposed, and those comprising a function to inform which one is played back or broadcasted to users by displaying it on a screen have been known (e.g., JP HEI-5-161084A).

When the playback by various playback equipments is made possible in addition to sending and receiving of television broadcast in this way, voice output with higher quality is required. Thus, needs to comprise the digital terminal capable of sending and receiving multiple channel signals are increased, and recently the television receivers comprising such digital. terminal capable of outputting sounds of 5.1 Ch in addition to 2 Ch stereo sound have been often proposed.

Conventionally, even when the external device is connected to the digital terminal in the television receiver comprising such digital terminal, it has been common that the output from the other voice output unit such as internal speakers is continued regardless of this.

However, when realistic clear sounds such as sounds of 5.1 Ch are output from the external device connected via the digital terminal, sounds output from the other voice output unit such as internal speakers are not necessary. Unnecessary voice output also increases consumed electric. energy of the television receiver. Furthermore, the unnecessary voice output shortens lifetime of various members such as amplifier and is uneconomic.

SUMMARY OF THE INVENTION

The present invention has been made in the light of the above points, and provides a television receiver capable of reducing consumed electric energy and increasing lifetime of various members by reducing unnecessary voice output with performing voice output with high quality.

According to a first aspect of the invention, a television receiver comprises: a coaxial terminal to perform digital voice output, to which an external device is connected; an output level detection circuit to detect an output level of the coaxial terminal; a microcomputer to determine whether the external device is connected to the coaxial terminal or not, based on a detection result of the output level detection circuit; a display to display a connection of the external device to the coaxial terminal when the microcomputer determines the connection of the external device; a setting unit to set muting of an output from the internal speaker; and a voice mute circuit to mute a voice output from the internal speaker, when the microcomputer determines that the external device is connected to the coaxial terminal, or when the setting unit sets the muting of an output from the internal speaker.

In accordance with the present invention, when a microcomputer determines based on results detected by an output level detection circuit that an external device has been connected to coaxial terminal, that effect is displayed on a display section. The user can set whether the output from an internal speaker is muted or not by a setting unit. When the microcomputer determines that the external device has been connected to the coaxial terminal or when the setting to mute the output from the internal speaker is given by the setting unit, a voice mute circuit mutes the voice output from the internal speaker.

Therefore, when the user wants not to output the unnecessary voice from the internal speaker, it is possible not to output the voice from the internal speaker and it is possible to reduce the consumed electric energy of the television receiver. The lifetime of a speaker amplifier can be prolonged by not operating the internal speaker built-in the television receiver.

According to a second aspect of the invention, a television receiver comprises: an internal speaker to output voice; a digital terminal to perform digital voice output, to which an external device is connected; a connection detection unit to detect whether an external device is connected to the digital terminal, or not; and a voice mute circuit to mute a voice output from the internal speaker when the connection detection unit detects that the external device is connected to the digital terminal.

In accordance with the present invention, when it is detected by a connection detection unit that the external device has been connected to the digital terminal, the voice mute circuit mutes the voice output from the internal speaker.

When the external device has been connected to the digital terminal, it is not necessary to output the voice from the internal speaker. Therefore, the consumed electric energy of the television receiver can be reduced, as well as it is possible to prolong the lifetime of the speaker amplifier by not operating the internal speaker built in the television receiver.

According to a third aspect of the invention, a television receiver comprises: an internal speaker to output voice; a digital terminal to perform digital voice output, to which an external device is connected; a connection detection unit to detect whether the external device is connected to the digital terminal, or not; a informing unit to inform a connection of the external device to the digital terminal when the connection detection unit determines the connection of the external device; a setting unit to set muting of an output from the internal speaker; and a voice mute circuit to mute an output from the internal speaker when the setting unit sets the muting of an output from the internal speaker.

In accordance with the present invention, the connection detection unit detects whether the external device has been connected or not to the digital terminal, and an informing unit informs that. The user recognizes by informing that the external device has been connected to the digital terminal, and performs the setting whether the output from the internal speaker is muted or not by the setting unit. When the user performs the setting to mute the voice output from the internal speaker by the setting unit, the voice mute circuit mutes the voice output from the internal speaker.

Therefore, it is possible to address depending on a use environment of the television receiver and convenience of the user. When the user has selected to mute the output from the internal speaker, the consumed electric energy of the television receiver can be reduced by muting the voice output from the internal speaker, as well as the lifetime of the speaker amplifier can be prolonged by not operating the internal speaker built-in the television receiver.

Preferably, the connection detection unit comprises an output level detection circuit to detect an output level of the digital terminal; and a microcomputer which determines a connection of the external device to the digital terminal when the output level detection circuit detects that the output level of the digital terminal has been reduced to one half or less of the output level when no external device is connected.

In accordance with this, when an output level detection circuit detects that an output level of the digital terminal is one half or less of the output level when the external device is not connected, the microcomputer determinates that the external device has been connected to the digital terminal. This way, it is detected whether the external device has been connected or not to the digital terminal Therefore, it is possible to detect by a simple unit whether the external device has been connected or not to the digital terminal. Thereby, it is possible to mute the voice output from the voice output unit such as internal speaker as needed when the external device has been connected to the digital terminal. Thus, the consumed electric energy of the television receiver can be reduced, as well as the lifetime of the speaker amplifier can be prolonged by not operating the internal speaker built-in the television receiver.

Preferably, the informing unit is a display to display a connection of the external device to the digital terminal when the connection detection unit detects the connection of the external device.

In accordance with this, it is informed to the user by displaying on the display section that the external device has been connected to the digital terminal.

Therefore, the user can easily recognize that the external device has been connected to the digital terminal. Thereby, the user can mute the output from the other voice output unit such as internal speaker only when the user hopes it, and it is possible to address depending on the use environment of the television receiver and the convenience of the user. When the user has selected to mute the output from the internal speaker, the consumed electric energy of the television receiver can be reduced by muting the voice output from the internal speaker, as well as the lifetime of the speaker amplifier can be prolonged by not operating the internal speaker built-in the television receiver.

Preferably, the digital terminal is a coaxial terminal.

In accordance with this, the external device is connected to a coaxial terminal as the digital terminal.

Therefore, it is possible to output realistic clear sounds such as stereo sounds and sounds of 5.1 ch. In this case, it is possible to mute the voice output from the other voice output unit such as internal speaker, the consumed electric energy of the television receiver can be reduced, as well as the lifetime of the speaker amplifier can be prolonged by not operating the internal speaker built-in the television receiver.

BRIEF DESCRIPTION OF THE DRAWINGS

The present invention will become more fully understood from the detailed description given hereinbelow and the appended drawings which given by way of illustration only, and thus are not intended as a definition of the limits of the present invention, and wherein.

DETAILED DESCRIPTION OF THE INVENTION

Hereinafter, a first embodiment of the present invention will be described in detail with reference to FIGS. 1 to 3. It is not intended that the scope of the present invention is limited to the illustrated examples, and it is as a matter of course that various changes can be made within the scope without departing the gist of the present invention.

Figure 1:
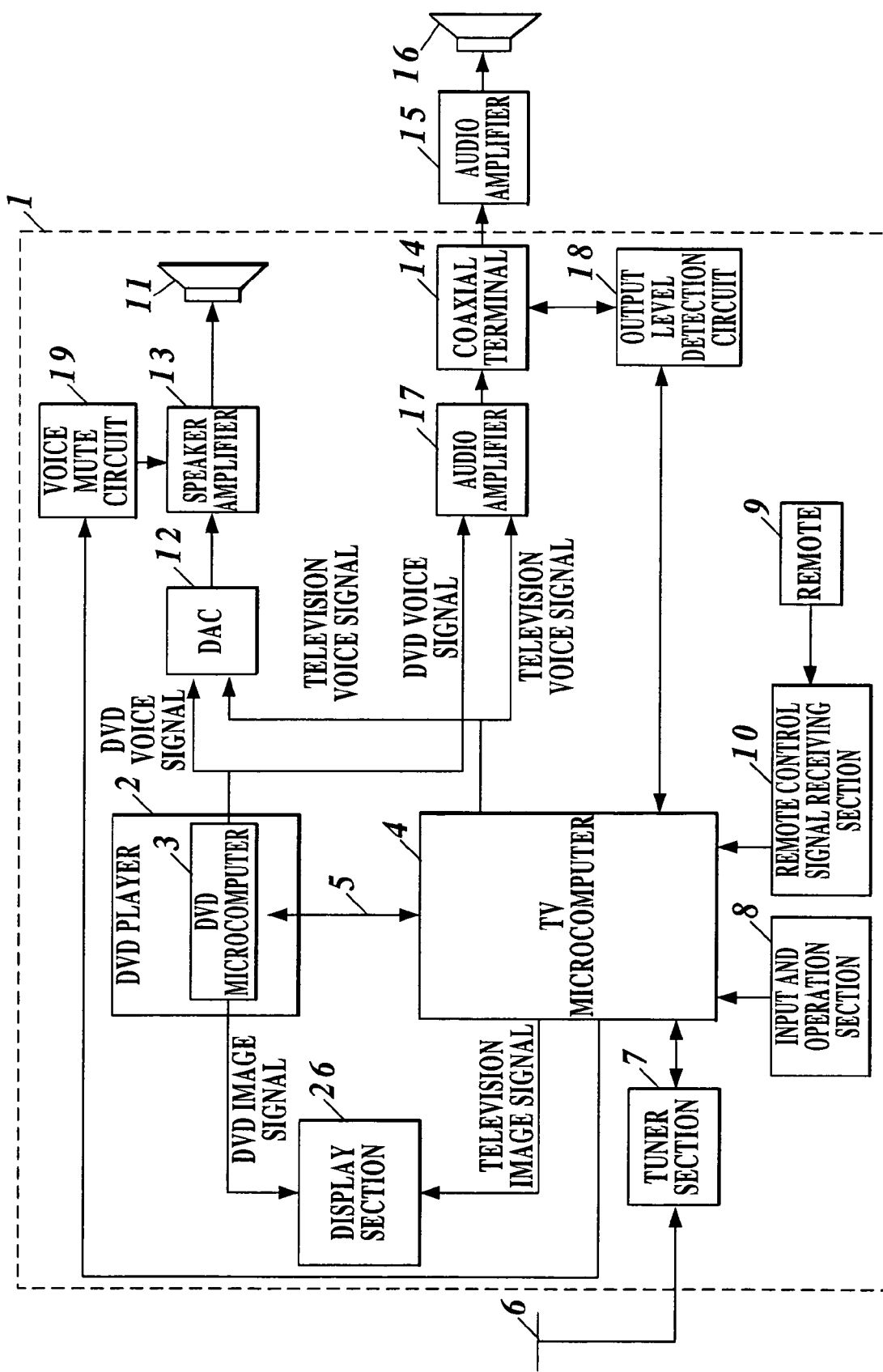
FIG. 1 is a block diagram showing a configuration of a television receiver of a first embodiment of the present invention.

As is shown in FIG. 1, a television receiver 1 in the present embodiment is a DVD player-integrated type in which a DVD player 2 has been built-in. The DVD player 2 comprises a CPU not shown in the figure and comprises a microcomputer 3 (referred to as "DVD microcomputer") for the DVD player, which controls an operation of each section of the DVD player 2. The DVD microcomputer 3 outputs DVD voice signals and DVD image signals played back by the DVD player 2.

The television receiver 1 is provided with a microcomputer 4 (referred to as "TV microcomputer") for the television comprising a CPU not shown in the figure as a control section which controls the operation of each section in the television receiver 1. The TV microcomputer 4 comprises a memory section (not shown in the figure) which houses various programs and data, and performs processing in accordance with various programs with reference to the data housed in the memory section.

The above DVD microcomputer 3 and TV microcomputer 4 are connected via a bus 5, and signals can be sent and received mutually.

The television receiver 1 receives television signals via an antenna 6 from broadcast stations. The television receiver 1 is provided with a tuner section 7 which selects the signals with frequency of the given station among the received television signals in accordance with direction from the TV microcomputer 4.

The television signals with frequency of the given station selected by the tuner section 7 are sent to the TV microcomputer 4, which then outputs television voice signals and television image signals based on these given television signals.

The television receiver 1 is also provided with an input and operation section 8 for the user to input various directions and commands for channel select and DVD playback. The input and operation section 8 is composed of a manipulation panel comprising multiple buttons, and various directions and commands are input by button pushing by the user. The television receiver 1 is also provided with a remote control signal receiving section 10 which receives the signals sent from a remote controller 9 (referred to as a "remote"), and receives various directions and commands sent from the remote 9 using infrared ray and the like. The signals input from the input and operation section 8 and remote signals received via the remote control signal receiving section 10 are sent to the TV microcomputer 4. The TV microcomputer 4 controls each section based on the sent signals.

In particular, in the present embodiment, the user can input the direction whether the voice output from the internal speaker 11 is muted or not by the input and operation section 8 or the remote 9, which will be described later. A setting unit to set whether the voice output is muted or not is composed of the input and operation section 8 and the remote 9.

The television receiver 1 is also provided with an internal speaker 11 which is connected to the TV microcomputer 4 and the DVD microcomputer 3, and outputs the voice based on television voice signals based on the television signals sent from the TV microcomputer 4 or DVD voice signals sent from the DVD microcomputer 3. A digital/analog converter 12 (referred to as "DAC") capable of converting the digital signals and the analog signals mutually and a speaker amplifier 13 which amplifies the signals sent from the TV microcomputer 4 and the DVD microcomputer 3 are provided between the TV microcomputer 4 and the DVD microcomputer 3, and the internal speaker 11.

Furthermore, the television receiver 1 is provided with a coaxial terminal 14 as the digital terminal which is connected to the TV microcomputer 4 and the DVD microcomputer 3, and outputs the television voice signals based on the television signals sent from the TV microcomputer 4 or DVD voice signals sent from the DVD microcomputer 3. The coaxial terminal 14 can send and receive the stereo voice signals of 2 Ch and the voice signals of 5.1 Ch by one cable, and it becomes possible to appreciate the sounds by stereo output or 5.1 Ch sound output by connecting an external audio amplifier 15 and an external speaker 16 to the coaxial terminal via the cable. An audio amplifier 17 which amplifies the signals sent from the TV microcomputer 4 and the DVD microcomputer 3 are provided between the TV microcomputer 4 and the DVD microcomputer 3, and the coaxial terminal 14.

An output level detection circuit 18 which detects whether the external device has been connected or not to the coaxial terminal 14 by detecting the output level of the voice signals output from the coaxial terminal 14 is connected to the coaxial terminal 14. When the external device such as audio amplifier 15 is connected to the coaxial terminal 14, the output level of coaxial terminal 14 is divided to become about one half. The output level detection circuit 18 detects this change of the output level, and sends a detection result as an electric signal to the TV microcomputer 4.

The TV microcomputer 4 determines from the detection result sent from the output level detection circuit 18 whether the external device has been connected or not to the coaxial terminal 14. That is, for example, the output level data when the external device is not connected to the coaxial terminal 14 are housed in the memory section of the TV microcomputer 4, and the TV microcomputer 4 compares the detection result sent from the output level detection circuit 18 with reference to the output level data housed in this memory section. The TV microcomputer 4 then determines that the external device has been connected to the coaxial terminal 14 when the output level detected by the output level detection circuit 18 is about one half of the output level when the external device is not connected to the coaxial terminal 14. A connection detection unit is composed of this output level detection circuit 18 and the TV microcomputer 4 in the present embodiment.

A voice mute circuit 19 which controls the voice mute for the speaker amplifier 13 is connected to the TV microcomputer 4. When the input and operation section 8 or the remote 9 is input to mute the voice output from the internal speaker 11, the TV microcomputer 4 sends a mute signal to the voice mute circuit 19. When receiving the mute signal from the TV microcomputer 4, the voice mute circuit 19 controls the voice mute for the speaker amplifier 13.

Figure 2:
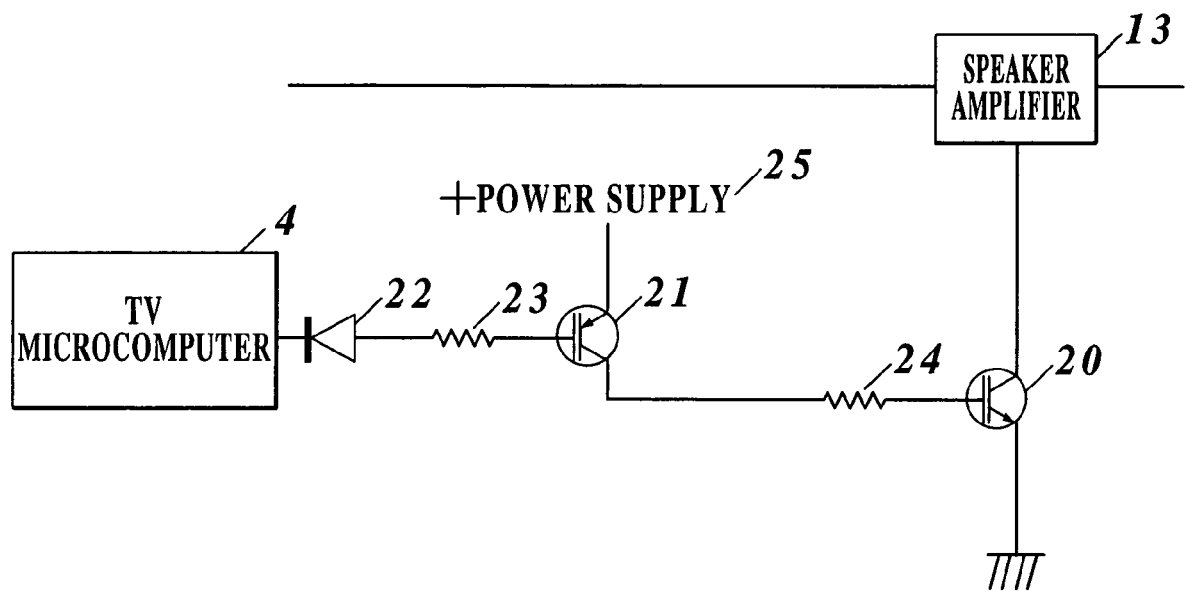
FIG. 2 is a circuit diagram showing one example of a voice mute circuit 19 applied to the television receiver according to the present invention.
Figure 3:
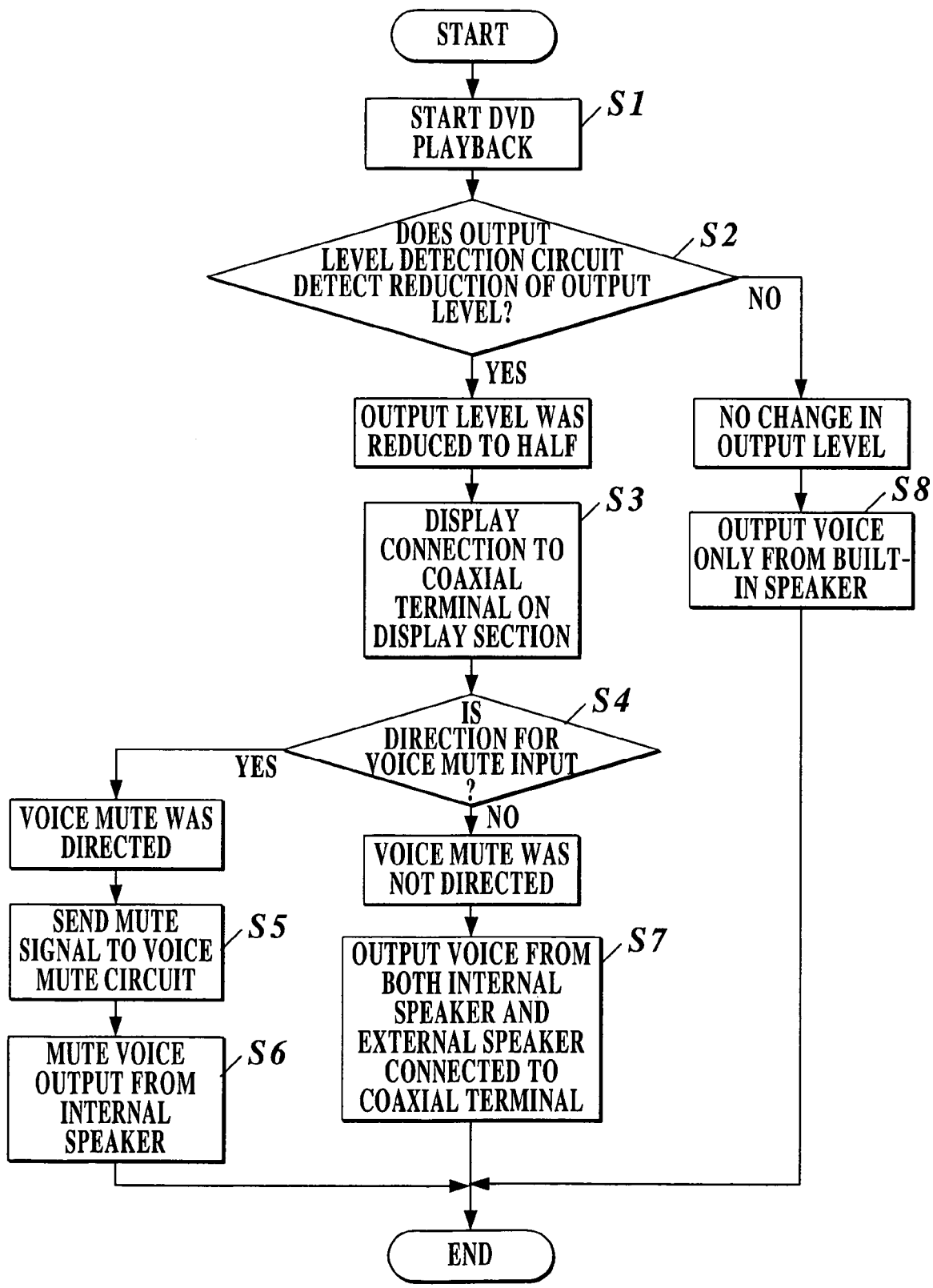
FIG. 3 is a flowchart showing an operation of the television receiver in the first embodiment of the present invention.

As shown in FIG. 2, for example, the voice mute circuit 19 comprises an NPN type transistor 20 grounding a voice line connected from the TV microcomputer 4 or the DVD microcomputer 3 to the internal speaker 11 by a switching and a PNP type transistor 21 which controls the input of the transistor 20 by receiving the mute signal (low). The voice mute circuit 19 also comprises a diode 22 which rectifies the mute signal sent from the TV microcomputer 4 and resistances 23 and 24 for optimizing base current of the transistors 20 and 21. Positive power supply voltage 25 has been applied to an emitter terminal not shown in the figure of the transistor 21, and the transistor 21 is switched by receiving the mute signal from the TV microcomputer 4 and controls the input of the transistor 20. For example, when the base current runs in the transistor 20 by switching the transistor 21, conduction is given to the transistor 20, and the voice line output from the speaker amplifier 13 to the internal speaker 11 is grounded to mute to the voice output of the internal speaker 11.

The voice mute circuit 19 may ground the voice line output from the speaker amplifier 13 to the internal speaker 11 and control the voice mute. The configuration thereof is not limited to one exemplified herein. For example, more resistances and condensers may be comprised.

The television receiver 1 is also provided with a display section 26 which is connected to the TV microcomputer 4 and the DVD computer 3, and outputs a given image based on television image signals based on television signals sent from the TV microcomputer 4 or DVD image signals sent from the DVD microcomputer. In the present embodiment, when the TV microcomputer 4 determines from the detection result by the output level detection circuit 18 that the external device has been connected to the coaxial terminal 14, the TV microcomputer 4 displays it and a message to ask the user whether the voice output of the internal speaker 11 is muted or not on the display section 26, and the display section 26 works as an informing unit.

The television receiver 1 is also provided with a power supply which supplies electric power to each section in the apparatus and is not shown in the figure.

Subsequently, with reference to FIG. 3, for the operation of the television receiver 1 according to the present invention, the case of playing back DVD using the DVD player 2 will be described as an example.

Playback of the DVD is started by turning on power, setting the DVD in the DVD player 2 and manipulating the input and operation section 8 or the remote 9 by the user (step S1).

The output level of the coaxial terminal 14 is detected as needed by the output level detection circuit 18, and the detection result is sent to the TV microcomputer 4. The TV microcomputer 4 determines whether the output level of the coaxial terminal 14 is reduced to one half of the level when the external device such as audio amplifier 15 is not connected to the coaxial terminal 14 (step S2). As a result, when it is determined that the output level has been reduced to one half (step S2; Yes), the TV microcomputer 4 displays that the external device has been connected to the coaxial terminal 14 and the message to ask whether the voice output from the internal speaker 11 is muted or not, on the display section 26 (step S3).

The user input the direction whether the voice output from the internal speaker 11 is muted or not for the message displayed on the display section 26 by manipulating the input and operation section 8 or the remote 9. The signal input from the input and operation section 8 or the remote 9 is sent to the TV microcomputer 4, and the TV microcomputer 4 determines whether the voice mute direction has been input or not (step S4). When the TV microcomputer determines that the voice mute direction has been input (step S4; yes), the TV microcomputer sends the mute signal to the voice mute circuit 19 (step S5) and the voice mute is controlled for the speaker amplifier 13 by the voice mute circuit 19. Thereby, the voice output from the internal speaker 11 is muted, and the voice is output from only an external speaker 16 connected to the coaxial terminal 14 (step S6). When the power of the audio amplifier 15 connected to the coaxial terminal 14 is off, the user turns on power optionally to output the sounds from the external speaker 16.

On the other hand, when the TV microcomputer determines that the voice mute direction has not been input or that the direction not to mute the voice output from the internal speaker 11 has been input (step S4; No), the TV microcomputer does not send the mute signal, and the sound is output from both the external speaker 16 connected to the coaxial terminal 14 and the internal speaker 11 (step S7).

When the TV microcomputer determines for the above that the output level has not been changed (step S2; No), the external speaker 16 has not been connected to the coaxial terminal 14, and thus, the sound is output from only the internal speaker 11 (step S8)

Although the case of playing back the DVD using the DVD player 2 was illustrated as an example in the above, when the television voice is output based on the television signals, it is also determined whether the external speaker 16 has been connected or not to the coaxial terminal 14, the user selects whether the voice is also output or not from the internal speaker 11, and if necessary it is possible to mute the voice output from the internal speaker 11.

As in the above, in accordance with the present embodiment, when the external device such as external speaker 16 has been connected to the coaxial terminal 14, the user optionally selects whether the voice is also output or not from the internal speaker 11, and it is possible to control the voice mute for the speaker amplifier 13. Thus, it is possible not to output the unnecessary voice from the internal speaker 11 and the consumed electric energy in the television receiver 1 can be reduced, as well as it is possible to prolong the lifetime of the speaker amplifier 13 by not operating the internal speaker 11 built-in the television receiver 1.

Figure 4:
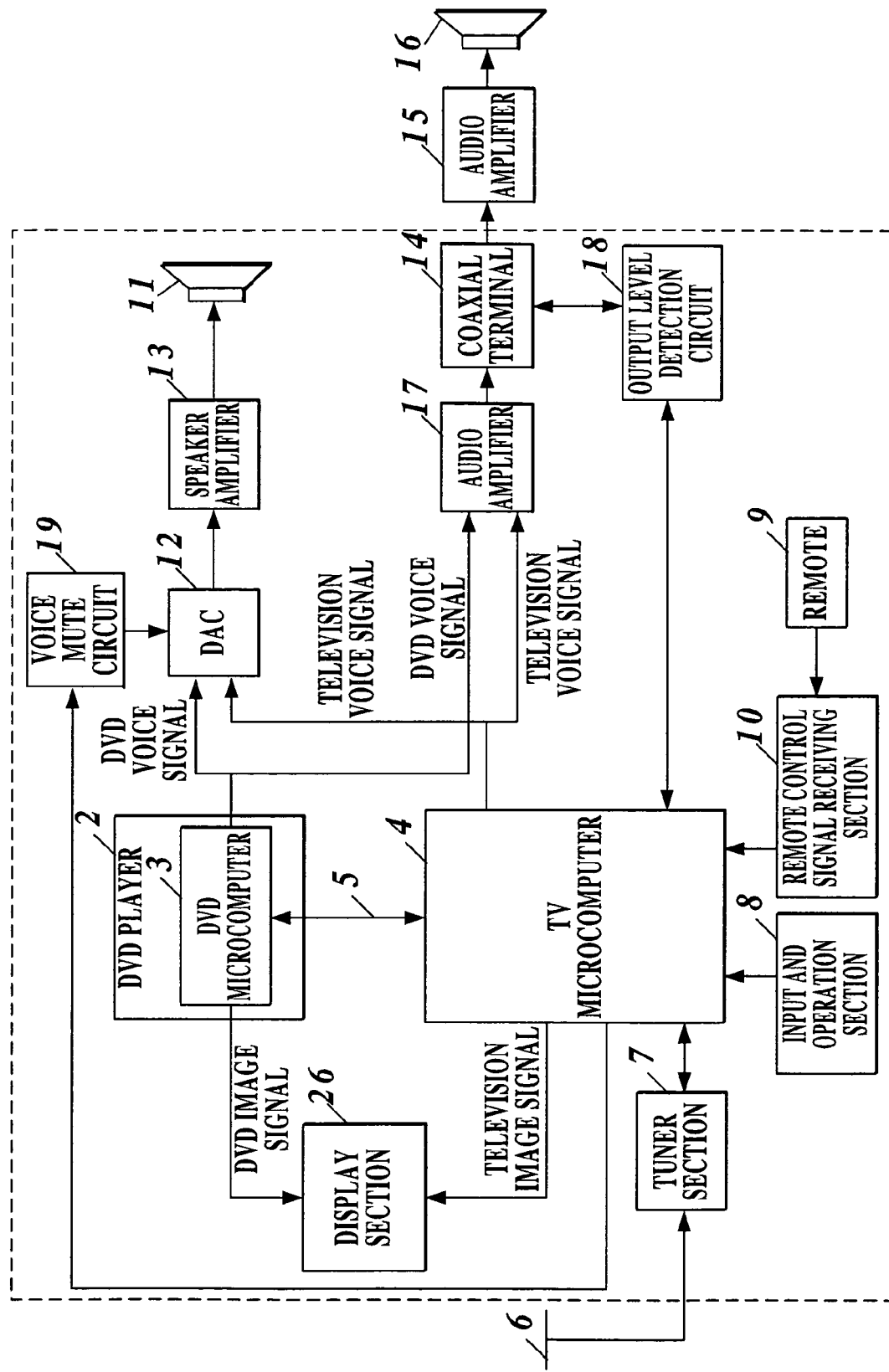
FIG. 4 is a block diagram showing a configuration of a modification example of the television receiver in the first embodiment of the present invention.

In the present embodiment, the voice output from the internal speaker 11 is muted by controlling the voice mute for the speaker amplifier 13, but the unit to mute the voice output from the internal speaker 11 is not limited to this. For example, as shown in FIG. 4, the voice output from the internal speaker 11 may be muted by providing the voice mute circuit 19 which controls the voice mute for DAC 12 so that the voice mute circuit 19 controls the voice mute for DAC 12 by receiving the mute signal from the TV microcomputer 4.

In the present embodiment, the DVD player-integrated television receiver 1 where the DVD player 2 had been built-in was illustrated as an example, but in addition to the DVD player, the other equipment such as videotape recorder which can play back the image and voice may be integrated in the television receiver. The television receiver 1 may be a single television receiver where the DVD player has not been built-in.

The present embodiment comprises the coaxial terminal 14, but it is enough to comprise at least the digital terminal connected to the external device and the internal speaker, and the digital terminal other than the coaxial terminal may be comprised.

The present embodiment comprises the output level detection circuit 18 as the connection detection unit, and it is determined by detecting the output level of the coaxial terminal 14 whether the external device has been connected or not to the coaxial terminal 14, but the connection detection unit to determine whether the external device has been connected or not to the coaxial terminal 14 is not limited to this. For example, a mechanical switch may be comprised as the connection detection unit, and it may be determined by this mechanical switch whether the terminal of the external device is inserted or not in the coaxial terminal 14.

In the present embodiment, the message that the external device has been connected to the coaxial terminal 14 is displayed on the display section 26 which is an image display screen when the image is broadcasted and played back, and the display section 26 is used to function as the informing unit to inform to the user. However, the display section may be provided separately from the image display screen when the image is broadcasted and played back. The informing unit is not limited to the display section 26, and the information may be informed to the user by the voice and the like.

In the present embodiment, when the external device has been connected to the coaxial terminal 14, the voice output from the internal speaker 11 is muted. However, when the television receiver 1 is provided with multiple voice output units, all of the voice output units other than the voice output unit connected to the external device may be muted.

It is a matter of course that the present invention is not limited to the above embodiments, and can be changed optionally.

Figure 5:
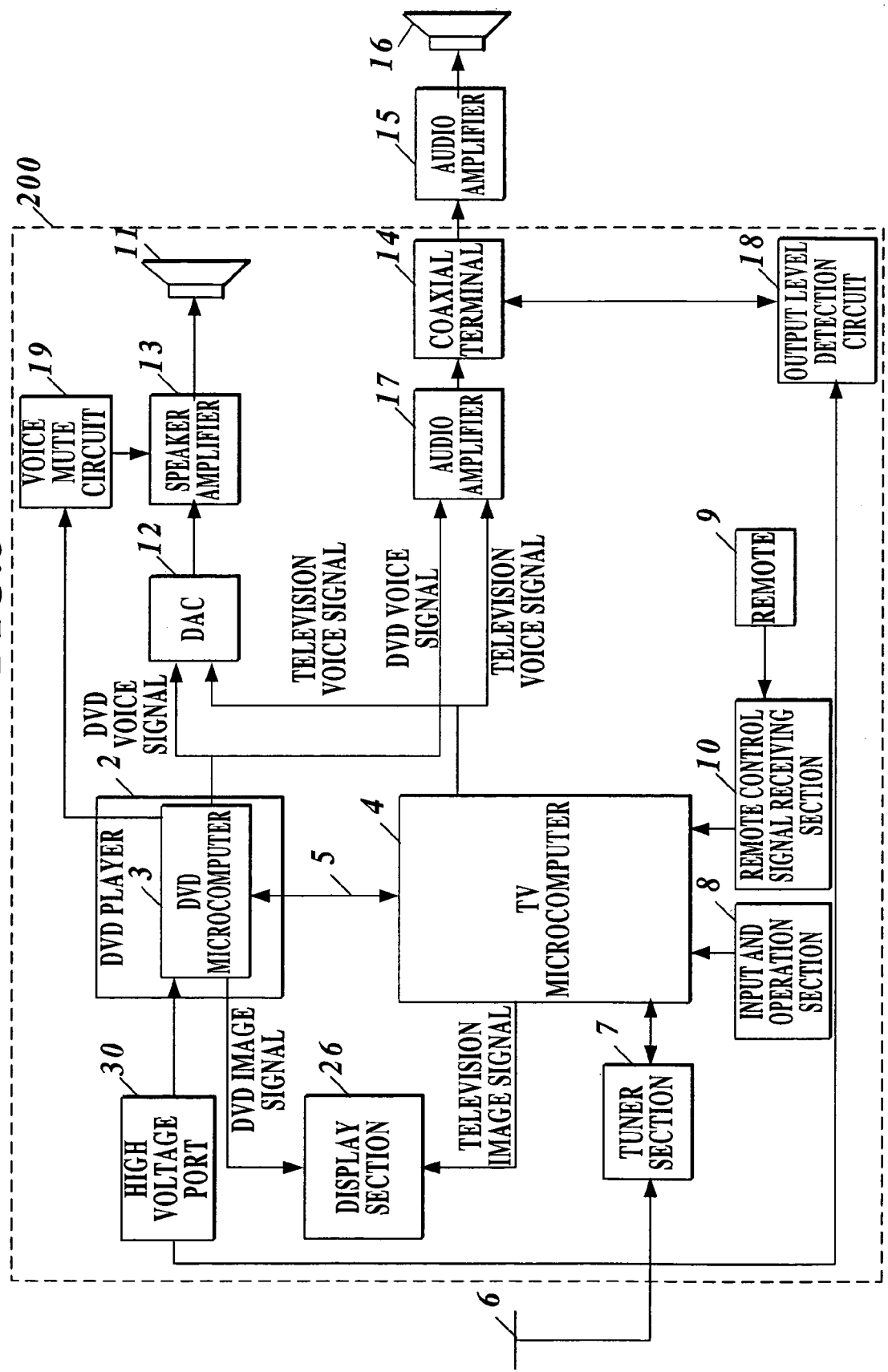
FIG. 5 is a block diagram showing a configuration of a television receiver of a second embodiment of the present invention.

Subsequently, with reference to FIG. 5, a second embodiment of the television receiver according to the present invention will be described. Different points from the first embodiment will be described below.

In the present embodiment, a television receiver 200 is a DVD player 2-integrated television receiver as is the case with the first embodiment and the second embodiment. The television receiver 200 is provided with a DVD microcomputer 3 which controls each operation of the DVD player 2 and a TV microcomputer 4 as a control section which control each operation of the television receiver. The DVD microcomputer 3 and the TV microcomputer 4 comprise a memory section (not shown in the figure) which houses various programs and data, and performs processings in accordance with various programs with reference to the data housed in the memory section.

The television receiver 200 comprises an internal speaker 11 which outputs the voice and a coaxial terminal 14 connected to the external device as is the case with the first embodiment and the second embodiment.

An output level detection circuit 18 which detects the output level of the coaxial terminal 14 is connected to the coaxial terminal 14. The output level detection circuit 18 is connected to the DVD microcomputer 3 via a high voltage port 30 and sends detection results as electric signals to the DVD microcomputer 3.

The DVD microcomputer 3 determines by the detection result sent from the output level detection circuit 18 whether the external device has been connected or not to the coaxial terminal 14. That is, the data of the output level when no external device is connected to the coaxial terminal 14 has been housed in the memory section of the DVD microcomputer 3, and the DVD microcomputer 3 compares the detection result sent from the output level detection circuit 18 with reference to the output level data housed in this memory section. The DVD microcomputer 3 determines that the external device has been connected to the coaxial terminal 14 when the output level detected by the output level detection circuit 18 is reduced to about one half of the output level when no external device is connected to the coaxial terminal 14. In the present embodiment, a connection detection unit is composed of the output level detection circuit 18 and the DVD microcomputer 3.

The DVD microcomputer 3 and the TV microcomputer 4 output given voice signals and image signals. The DVD voice signals and the TV voice signals are sent to the internal speaker 11 and the coaxial terminal 14 along given voice lines. DAC 12 which converts the DVD voice signals and the TV voice signals into digital/analog signals and a speaker amplifier 13 which amplifies the signals are provided between the DVD microcomputer 3 and the TV microcomputer 4, and the internal speaker 11.

A voice mute circuit 19 which controls the voice mute for the speaker amplifier 13 is connected to the DVD microcomputer 3. The voice mute circuit 19 has almost the same configuration as in the first embodiment, and controls the voice mute for the speaker amplifier 13 by receiving. the mute signal from the DVD microcomputer 3.

Since the other configurations are the same as in the first embodiment, the same numeral is given to the same site and their explanations are omitted.

Subsequently, for the operation of the television receiver 200 according to the present embodiment, the case of playing back DVD using the DVD player 2 will be described as an example.

When the user turns on power to start the playback of DVD, the output level detection circuit 18 detects as needed the output level of the coaxial terminal 14 and the detection result is sent to the DVD microcomputer 3 via the high voltage port 30. As a result of the detection by the output level detection circuit 18, when the output level of the coaxial terminal 14 is reduced to one half of the output level when the external device such as audio amplifier 15 is not connected, the DVD microcomputer 3 display the message that the external device has been connected to the coaxial terminal 14 and to ask whether the voice output from the internal speaker 11 is muted or not on the display section 26.

When the direction to mute the voice output from the internal speaker 11 has been input by the user, The DVD microcomputer 3 sends the mute signal to the voice muter circuit 19 and the voice mute for the speaker amplifier 13 is controlled by the voice mute circuit 19. Thereby, the voice output from the internal speaker 11 is muted, and the voice is output from only the external speaker 16 connected to the coaxial terminal 14.

On the other hand, when the direction to mute the voice has not been input by the user or when the direction that the voice output from the internal speaker 11 is not muted has been input by the user, the DVD microcomputer does not send the mute signal, and the voice is output from both the external speaker 16 connected to the coaxial terminal 14 and the internal speaker 11.

Meanwhile, when the output level has not been changed, the external speaker 16 is not connected to the coaxial terminal 14, and thus the voice is output from only the internal speaker 11.

The case of playing back the DVD using the DVD player 2 was illustrated as an example in the above, but the case of outputting the television voice based on the television signals is the same as is the case with the first embodiment.

As in the above, in accordance with the present embodiment, when the external device such as external speaker 16 has been connected to the coaxial terminal 14, the user can optionally select whether the voice is output from the internal speaker 11 or not, the mute signal is sent to the voice mute circuit 19 by the DVD microcomputer 3, and the voice mute for the speaker amplifier 13 can be controlled. Thus, it is possible not to output the unnecessary voice from the internal speaker 11, and it is possible to reduce the consumed electric energy of the television receiver 200. The lifetime of a speaker amplifier can be prolonged by not operating the internal speaker 11 built-in the television receiver 200.

In the present embodiment, the voice output from the internal speaker 11 is muted by controlling the voice mute for the speaker amplifier 13, but the voice output from the internal speaker 11 may be muted by controlling the voice mute for DAC 12.

The present invention is not limited to the present embodiment as is the case with the first embodiment.

Subsequently a third embodiment of the television receiver according to the present invention will be described. Different points from the first and second embodiments will be described below.

In the present embodiment, a television receiver 200 is a DVD player 2-integrated television receiver as is the case with the first embodiment and the second embodiment. The television receiver is provided with a DVD microcomputer 3 which controls each operation of the DVD player 2 and a TV microcomputer 4 as a control section which control each operation of the Television receiver. The DVD microcomputer 3 and the TV microcomputer 4 comprise a memory section (not shown in the figure) which houses various programs and data, and performs processings in accordance with various programs with reference to the data housed in the memory section.

The television receiver comprises an internal speaker 11 which outputs the voice as a voice output unit and a coaxial terminal 14 as is the case with the first embodiment and the second embodiment.

An output level detection circuit 18 which detects the output level of the coaxial terminal 14 is connected to the coaxial terminal 14. The output level detection circuit 18 is connected to the TV microcomputer 4, and sends detection results as electric signals to the TV microcomputer 4.

The DVD microcomputer 3 and the TV microcomputer 4 output given voice signals and image signals. The DVD voice signals and the TV voice signals are sent to the internal speaker 11 and the coaxial terminal 14 along given voice lines. DAC 12 which converts the DVD voice signals and the TV voice signals into digital/analog signals and a speaker amplifier 13 which amplifies the signals are provided between the DVD microcomputer 3 and the TV microcomputer 4, and the internal speaker 11.

A voice mute circuit 19 which controls the voice mute for the speaker amplifier 13 is connected to the TV microcomputer 4. The voice mute circuit 19 has almost the same configuration as in the first and second embodiments, and controls the voice mute for the speaker amplifier 13 by receiving the mute signal from the TV microcomputer 4.

Since the other configurations are the same as in the first and second embodiments, the same numeral is given to the same site and their explanations are omitted.

Figure 6:
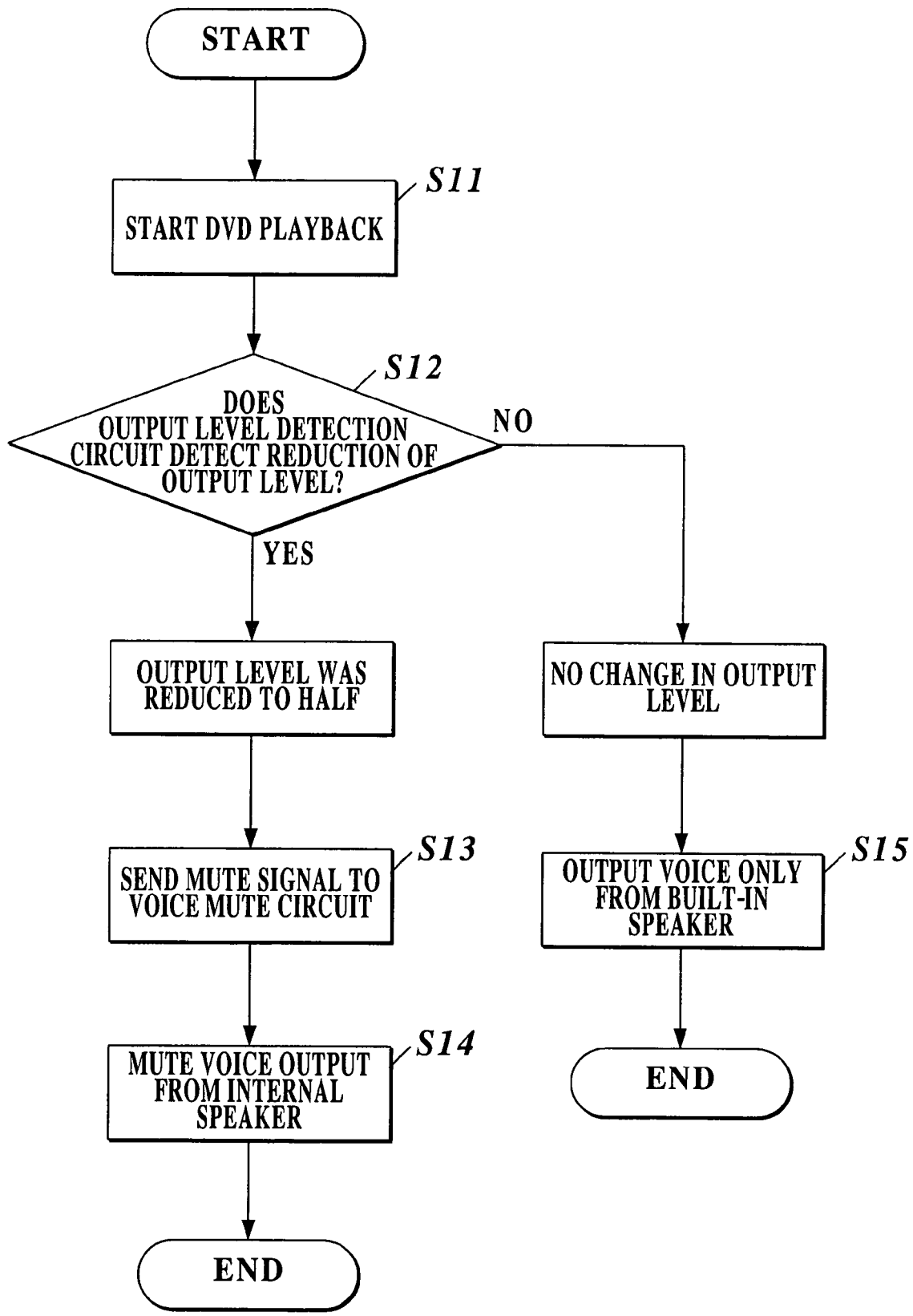
FIG. 6 is a flowchart showing an operation of the television receiver in a third embodiment of the present invention

Subsequently, with reference to FIG. 6, for the operation of the television receiver according to the present embodiment, the case of playing back DVD using the DVD player 2 will be described as an example.

The user turns on power and sets the DVD in the DVD player 2, and the playback of DVD is started by manipulating the input and operation section 8 or the remote 9 (step S11).

The output level of the coaxial terminal 14 is detected as needed by the output level detection circuit 18, and the detection result is sent to the TV microcomputer 4. The TV microcomputer 4 determines whether the output level of the coaxial terminal 14 is reduced to one half of the level when the external device such as audio amplifier 15 is not connected to the coaxial terminal 14 (step S12). As a result, when it is determined that the output level has been reduced to one half (step S12; Yes), the TV microcomputer 4 sends the mute signal to the voice mute circuit 19 (step S13), and the voice mute for the speaker amplifier 13 is controlled by the voice mute circuit 19. Thereby, the voice output from the internal speaker 11 is muted, and the voice is output from only the external speaker 16 connected to the coaxial terminal 14 (step S14).

On the other hand, when the TV microcomputer determines for the above that the output level has not been changed (step S12; No), the external speaker 16 has not been connected to the coaxial terminal 14, and thus, the voice is output from only the internal speaker 11 (step S15)

The case of playing back the DVD using the DVD player 2 was illustrated as an example in the above, but the case of outputting the television voice based on the television signals is the same as is the case with the first and second embodiments.

As in the above, in accordance with the present embodiment, the television receiver is under the use environment where the external device such as external speaker 16 has been often connected to the coaxial terminal 14, without asking the user in each case whether the voice is output from the internal speaker 11 or not, it is possible to control the voice mute for the internal speaker 11. Thus, when the voice from the external speaker 16 connected to the coaxial terminal is often appreciated, it is possible not to output the unnecessary voice from the internal speaker 11 with skipping user's trouble, and it is possible to reduce the consumed electric energy of the television receiver. The lifetime of a speaker amplifier 13 can also be prolonged by not operating the internal speaker 11 built-in the television receiver.

In the present embodiment, the voice output from the internal speaker 11 is muted by controlling the voice mute for the speaker amplifier 13, but the voice output from the internal speaker 11 may be muted by controlling the voice mute for DAC 12.

In the present embodiment, the TV microcomputer 4 determines whether the external device such as external speaker 16 has been connected to the coaxial terminal 14 and sends the mute signal to the voice mute circuit 19. However, as in the second embodiment, the DVD microcomputer 3 may control the voice mute. In this case, the output level detection circuit 18 is connected to the DVD microcomputer 3 via the high voltage port as is the case with the second embodiment.

As the present embodiment, when the external device such as external speaker 16 has been connected to the coaxial terminal 14, it may be previously determined as an attribute of the television receiver or may be optionally set by the user to mute for the internal speaker 11 without asking the user or to ask the user whether the internal speaker 11 is muted or not when he external device such as external speaker 16 has been connected to the coaxial terminal 14 as the first and second embodiments.

The present invention is not limited to the present embodiment as is the case with the first and second embodiments.

The entire disclosure of Japanese Patent Application No. 2005-025962 filed on Feb. 2, 2005, including description, claims, drawings and summary are incorporated herein by reference.

What is claimed is:

1. A television receiver comprising:
 a coaxial terminal to perform digital voice output, to which an external device is connected;
 an output level detection circuit to detect an output level of the coaxial terminal;
 a microcomputer to determine whether the external device is connected to the coaxial terminal or not, based on a detection result of the output level detection circuit;
 a display to display a connection of the external device to the coaxial terminal when the microcomputer determines the connection of the external device;
 a setting unit to set muting of an output from the internal speaker; and
 a voice mute circuit to mute a voice output from the internal speaker, when the microcomputer determines that the external device is connected to the coaxial terminal, or when the setting unit sets the muting of an output from the internal speaker.

2. A television receiver comprising:
 an internal speaker to output voice;
 a digital terminal to perform digital voice output, to which an external device is connected;
 a connection detection unit to detect whether the external device is connected to the digital terminal, or not;
 a informing unit to inform a connection of the external device to the digital terminal when the connection detection unit determines the connection of the external device;
 a setting unit to set muting of an output from the internal speaker; and
 a voice mute circuit to mute an output from the internal speaker when the setting unit sets the muting of an output from the internal speaker.

3. The television receiver as claimed in claim 2, wherein the connection detection unit comprises:
 an output level detection circuit to detect an output level of the digital terminal; and
 a microcomputer which determines a connection of the external device to the digital terminal when the output level detection circuit detects that the output level of the digital terminal has been reduced to one half or less of the output level when no external device is connected.

4. The television receiver as claimed in claim 3, wherein the informing unit is a display to display a connection of the external device to the digital terminal when the connection detection unit detects the connection of the external device.

5. The television receiver as claimed in claim 4, wherein the digital terminal is a coaxial terminal.

6. The television receiver as claimed in claim 3, wherein the digital terminal is a coaxial terminal.

7. The television receiver as claimed in claim 2, wherein the informing unit is a display to display a connection of the external device to the digital terminal when the connection detection unit detects the connection of the external device.

8. The television receiver as claimed in claim 7, wherein the digital terminal is a coaxial terminal.

9. The television receiver as claimed in claim 2, wherein the digital terminal is a coaxial terminal.

10. A television receiver comprising:
 an internal speaker to output voice;
 a digital terminal to perform digital voice output, to which an external device is connected;
 a connection detection unit to detect whether an external device is connected to the digital terminal, or not; and a voice mute circuit to mute a voice output from the internal speaker when the connection detection unit detects that the external device is connected to the digital terminal, wherein the digital terminal is a coaxial terminal, wherein the connection detection unit comprises:

an output level detection circuit to detect an output level of the digital terminal; and a microcomputer which determines a connection of the external device to the digital terminal when the output level detection circuit detects that the output level of the digital terminal has been reduced to one half or less of the output level when no external device is connected.

11. The television receiver as claimed in claim 10, further comprising an informing unit to inform a connection of the external device to the digital terminal when the connection detection unit determines the connection of the external device, wherein the informing unit is a display to display a connection of the external device to the digital terminal when the connection detection unit detects the connection of the external device.

* * * * *